(12) United States Patent
Balakrishnan et al.

(10) Patent No.: US 9,323,574 B2
(45) Date of Patent: Apr. 26, 2016

(54) PROCESSOR POWER OPTIMIZATION WITH RESPONSE TIME ASSURANCE

(71) Applicant: International Business Machines Corporation, Armonk, NY (US)

(72) Inventors: Ganesh Balakrishnan, Austin, TX (US); Mohammad Peyravian, Cary, NC (US); Srinivasan Ramani, Cary, NC (US); Brian M. Rogers, Durham, NC (US); Ken V. Vu, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 184 days.

(21) Appl. No.: 14/185,974

(22) Filed: Feb. 21, 2014

(65) Prior Publication Data

US 2015/0242243 A1    Aug. 27, 2015

(51) Int. Cl.
*G06F 9/46* (2006.01)
*G06F 9/50* (2006.01)
*G06F 9/48* (2006.01)

(52) U.S. Cl.
CPC ............ *G06F 9/5011* (2013.01); *G06F 9/4893* (2013.01); *Y02B 60/142* (2013.01); *Y02B 60/144* (2013.01); *Y02B 60/167* (2013.01)

(58) Field of Classification Search
CPC ........ G06F 9/5011; G06F 9/48; G06F 9/4893
USPC .............................................. 718/1, 100–108
See application file for complete search history.

(56) References Cited

U.S. PATENT DOCUMENTS

| | | | |
|---|---|---|---|
| 6,289,488 B1 * | 9/2001 | Dave .................... | G06F 9/4887 712/28 |
| 7,487,319 B2 * | 2/2009 | Benhase ............... | G06F 9/5016 707/999.202 |
| 8,046,605 B2 | 10/2011 | Krauthgamer et al. | |
| 8,161,482 B1 | 4/2012 | Sakarda | |
| 8,214,829 B2 * | 7/2012 | Neogi ................... | G06F 1/3203 713/300 |
| 8,381,004 B2 | 2/2013 | Elnozahy et al. | |
| 8,484,492 B2 * | 7/2013 | Yen ........................ | G06F 1/26 713/300 |
| 8,484,495 B2 * | 7/2013 | Boyd .................... | G06F 1/3203 713/320 |
| 8,510,741 B2 * | 8/2013 | Leiserson ............ | G06F 9/4881 709/223 |
| 8,578,386 B1 * | 11/2013 | Bali ....................... | G06F 1/329 718/104 |
| 8,615,763 B2 * | 12/2013 | Raghu ................... | G06F 1/329 718/100 |
| 8,621,472 B2 * | 12/2013 | Longobardi .......... | G06F 9/5033 718/100 |
| 8,635,625 B2 * | 1/2014 | Hanson ................. | G06F 1/3203 718/100 |

(Continued)

FOREIGN PATENT DOCUMENTS

EP    1365312 A1    11/2003

OTHER PUBLICATIONS

Corbalán et al, "Performance-Driven Processor Allocation", ACM, pp. 1-13, 2000.*

(Continued)

*Primary Examiner* — Anil Khatri

(74) *Attorney, Agent, or Firm* — Katherine S. Brown; Jeffrey L. Streets

(57) ABSTRACT

A method for managing processor power optimization is provided. The method may include receiving a plurality of tasks for processing by a processor environment. The method may also include allocating a portion of a compute resource corresponding to the processor environment to each of the received plurality of tasks, the allocating of the portion being based on both an execution time and a response time associated with each of the received plurality of tasks.

17 Claims, 5 Drawing Sheets

(56) References Cited

U.S. PATENT DOCUMENTS

| | | | | |
|---|---|---|---|---|
| 8,745,629 | B2* | 6/2014 | Gargash | G06F 9/5011 718/104 |
| 8,782,653 | B2* | 7/2014 | Gibson | G06F 1/3206 718/103 |
| 8,869,157 | B2* | 10/2014 | Raney | G06F 9/5044 718/102 |
| 8,954,487 | B2* | 2/2015 | Jung | G06F 15/16 709/202 |
| 2004/0111506 | A1 | 6/2004 | Kundu et al. | |
| 2012/0180061 | A1 | 7/2012 | Rao et al. | |
| 2013/0283289 | A1 | 10/2013 | Adinarayan et al. | |

OTHER PUBLICATIONS

Shis et al, "A performance goal oriented processor allocation technique for centralized heterogeneous multi-cluster environments", IEEE, pp. 614-615, 2011.*

Wang et al, "Optimizing Software Cache Performance of Packet Processing Applications", ACM, pp. 227-235, 2007.*

Hanumaiah et al, "Throughput Optimal Task Allocation under Thermal Constraints for Multi-core Processors" ACM, pp. 776-781, 2009.*

Chatziparaskevas et al, "An FPGA-based Parallel Processor for Black-Scholes Option Pricing Using Finite Differences Schemes", ACM, pp. 1-6, 2012.*

Papaefstathiou et al, Software processing performance in network processors, IEEE, pp. 1-6, 2004.*

Ishfaq Ahmad et al., "Using Game Theory for Scheduling Tasks on Multi-Core Processors for Simultaneous Optimization of Performance and Energy", 2008 IEEE.

Topcuoglu, H. et al., "Performance-effective and low-complexity task scheduling for heterogeneous computing", 2002 IEEE. Transactions on Parallel and Distributed Systems, vol. 13, No. 3, Mar. 2002, pp. 260-274.

Eswari et al. "Expected Completion Time based Scheduling Algorithm for Heterogeneous Processors", 2011 International Conference on Information Communication and Management IPCSIT vol. 16 (2011) IACSIT Press, Singapore. pp. 72-77.

* cited by examiner

PROCESSOR POWER OPTIMIZATION WITH RESPONSE TIME ASSURANCE

FIELD OF THE INVENTION

The present invention relates generally to the field of computing, and more particularly to processor power management.

BACKGROUND

Processor power management is an increasingly important strategy with the proliferation of computers. Reducing energy usage by processors provides many advantages, such as reducing costs, increasing component longevity and reducing heat production. For example, in a datacenter containing servers used in cloud computing, the energy required to power processors and attendant cooling systems may represent a significant operating expense. To reduce processor energy consumption, processor power usage mechanisms have been developed to dynamically control processor power usage.

Examples of some processor power usage mechanisms may include: dynamic voltage and frequency scaling (DVFS), processor core nap, and processor folding. Dynamic voltage scaling is a power usage mechanism where the voltage used in a processor can be increased or decreased dynamically. Dynamic frequency scaling is a power usage mechanism where the processor frequency can be increased or decreased dynamically. Lower voltage or lower frequency yields less power consumption by the processor. Processor core nap can be used to clock off most of the circuits inside a processor core when there is no work to be done by the core to save energy. This causes the core to go into a low-power idle state. Processor folding is a power usage mechanism where the number of available processor cores can be increased or decreased dynamically. Tasks are reallocated to the available cores and the other cores remain in low-power idle states.

These processor power usage mechanisms must be utilized to facilitate desired energy reduction goals. If, however, processor power usage mechanisms are aggressively used to reduce energy consumption, processor throughput may drop too low resulting in unacceptable task response time for a user.

SUMMARY

According to one exemplary embodiment, a method for managing processor power optimization is provided. The method may include receiving a plurality of tasks for processing by a processor environment. The method may also include allocating a portion of a compute resource corresponding to the processor environment to each of the received plurality of tasks, the allocating of the portion being based on both an execution time and a response time associated with each of the received plurality of tasks.

According to one exemplary embodiment, a computer system for managing processor power optimization is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving a plurality of tasks for processing by a processor environment. The method may also include allocating a portion of a compute resource corresponding to the processor environment to each of the received plurality of tasks, the allocating of the portion being based on both an execution time and a response time associated with each of the received plurality of tasks.

According to one exemplary embodiment, a computer program product for managing processor power optimization is provided. The computer program product may include one or more computer-readable storage devices and program instructions stored on at least one of the one or more tangible storage devices, the program instructions executable by a processor. The computer program product may include receiving a plurality of tasks for processing by a processor environment. The method may also include allocating a portion of a compute resource corresponding to the processor environment to each of the received plurality of tasks, the allocating of the portion being based on both an execution time and a response time associated with each of the received plurality of tasks.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
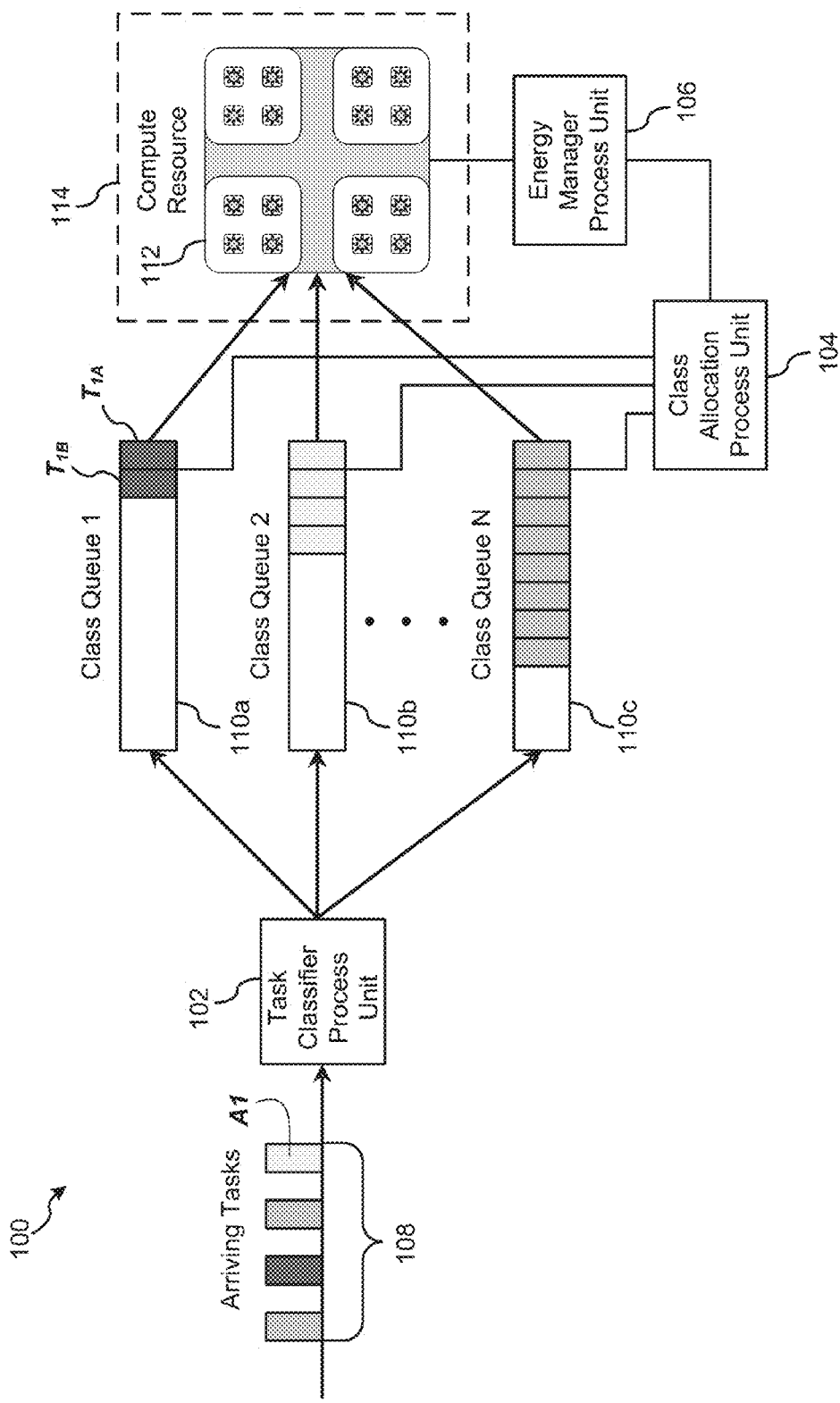
FIG. 1 is a block diagram of the processor power optimization with response time assurance system according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to processor power management. The following described exemplary embodiments provide a system, method and program product for processor power optimization with response time assurance.

The present invention may be a system, a method, and/or a computer program product. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for processor power optimization with response time assurance.

Referring now to FIG. 1, a system block diagram of a processor power optimization with response time assurance system 100 according to at least one embodiment is depicted. The processor power optimization with response time assurance system 100 may include a task classifier process unit 102, a class allocation process unit 104 and an energy manager process unit 106.

As depicted, according to one embodiment, the processor power optimization with response time assurance system 100 receives tasks 108 having execution time and response time characteristics. The task classifier process unit 102 may then assign each of the tasks 108 to one of class queues 110a-110c based on each tasks 108 execution time and response time characteristics.

According to one implementation, the task classifier process unit 102 may monitor header information associated with the received tasks 108. The task classifier process unit 102 may utilize the header information to indicate the task-type (e.g., content streaming, searches, payment transaction, etc.). Based on, for example, a lookup table entry, the task classifier process unit 102 may correlate each indicated task-type to one of the class queues 110a-110c. For example, received task A1 may be determined to be a content streaming task-type. The lookup table may accordingly assign class queue 110b to the content streaming task-type, whereby class queue 110b stores or buffers task-types having the same or similar execution time and response time characteristics to that of the content streaming task designated by A1.

The class allocation process unit 104 then allocates a portion of a compute resource 112 to each active class queue 110 for processing a task 108 within the desired response time. The compute resource 112 may be the total number of threads of execution (threads) supported by one or more processor cores contained within a processor environment 114. The processor environment 114 may be, for example, a single device or multiple interconnected devices where each device may contain one or more single core or multi-core processors. Examples of such devices may include a server, a desktop computer, a laptop, a telephone, a PDA, a tablet computer, or any other device containing one or more processors. The energy manager process unit 106 monitors the amount of compute resource utilization and increases or decreases available compute resource 112 as necessary through processor power usage mechanisms such as DVFS, processor core nap and processor folding to ensure compute resource utilization is within a target range.

Figure 2:
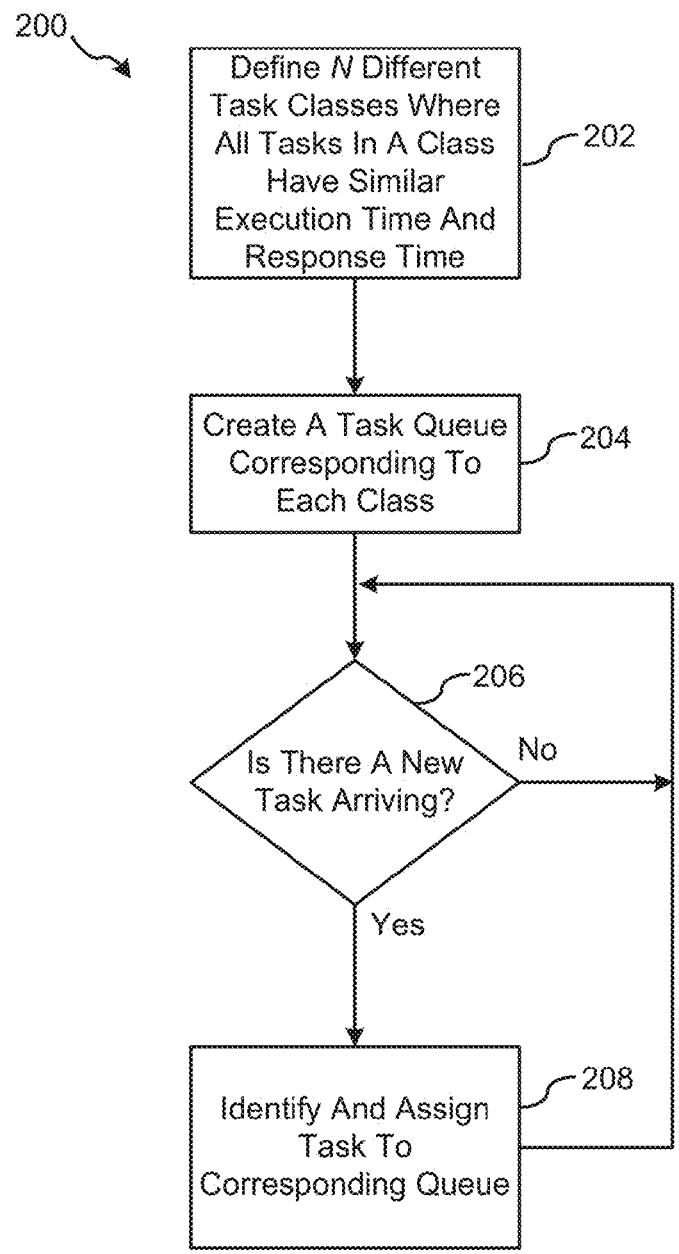
FIG. 2 is an operational flow chart illustrating a process for task classification according to at least one embodiment.

Referring now to FIG. 2, an operational flowchart illustrating the exemplary task classifier process 200 performed the task classifier process unit 102 (FIG. 1) according to at least one embodiment is depicted. Task classifier process 200 may be executed within the task classifier process unit 102 (FIG. 1). The task classifier process 200 begins at 202 by defining N different task classes. A class is created corresponding to each unique combination of execution time and response time characteristics for every task that the processor power optimization with response time assurance system 100 (FIG. 1) will process.

Next, at 204, a class queue 110 (FIG. 1) data structure may be created for each class defined. Where N classes were defined at 202, N class queues 110 (FIG. 1) may be created. The class queues 110 (FIG. 1) created may, according to one embodiment, operate under a first in first out (FIFO) policy. The class queues 110 (FIG. 1) may be implemented, for example, in software by using an array or linked list, or in hardware by using a buffer or registers.

Then, at 206, the task classifier process 200 checks for an arriving task 108 (FIG. 1) to process. If there is no new task 108 (FIG. 1) found, the task classifier process unit 102 may wait a short amount of time and check again for the arrival a new task 108 (FIG. 1).

However, if there is a new task 108 (FIG. 1) found, at 208, the new task 108 (FIG. 1) is classified based on the task 108 (FIG. 1) execution time and response time characteristics. Then, according to one embodiment, the task 108 (FIG. 1) is placed at the end of one the designated class queues 110a-110b (FIG. 1) corresponding to the class the task 108 (FIG. 1) was assigned. The task classifier process unit 102 then returns to 206 to check for arrival of any new tasks 108 (FIG. 1) to process.

Figure 3:
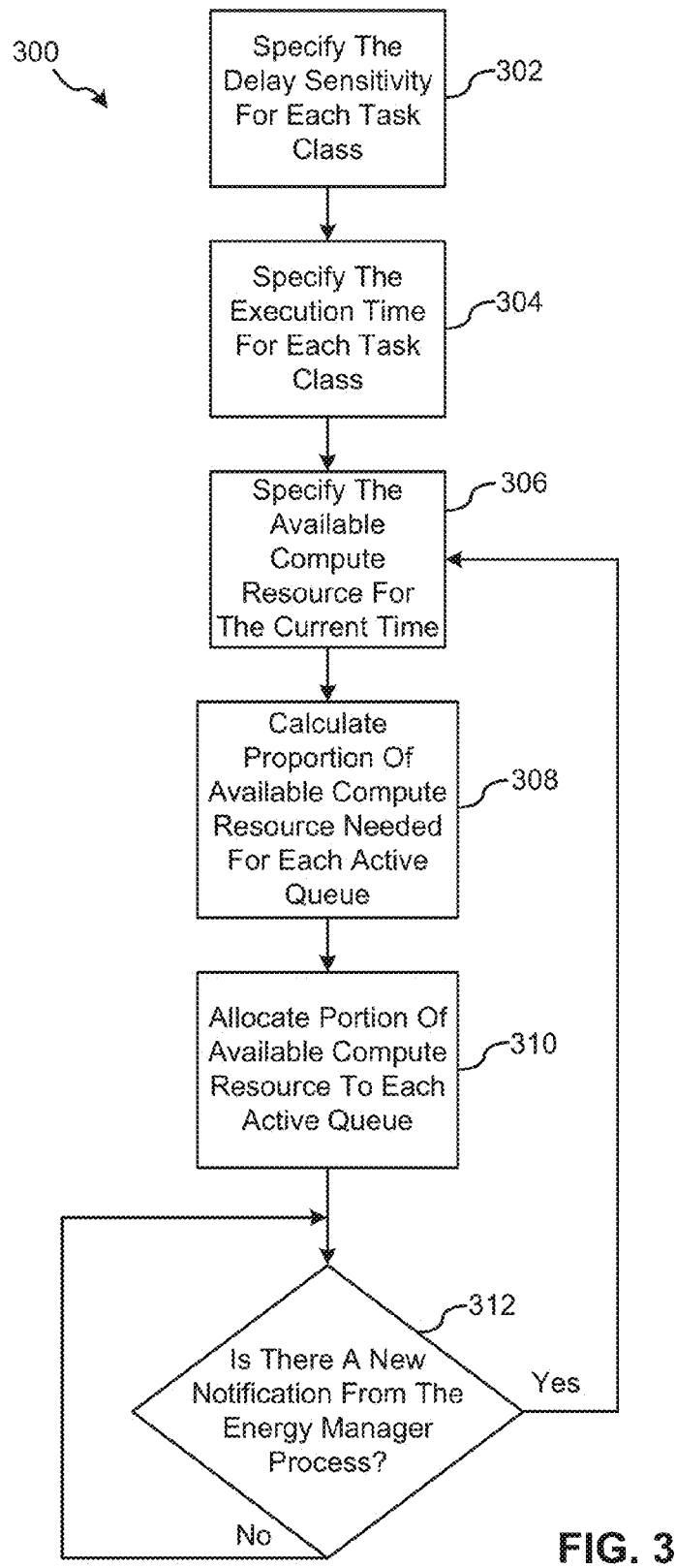
FIG. 3 is an operational flowchart illustrating a process for class allocation according to at least one embodiment.

With respect to FIG. 3, an operational flowchart illustrating the exemplary class allocation process 300 performed by the class allocation process unit 104 (FIG. 1) according to at least one embodiment is depicted. Class allocation process 300 may be executed within the class allocation process unit 104 (FIG. 1). At 302, the class allocation process 300 specifies a normalized delay factor D for each class i associated with the received tasks 108 (FIG. 1). As previously indicated, each class i is assigned based on its respective response time characteristic. Classes having faster response time characteristics (e.g., streaming video) are assigned numerically higher delay factors $D_i$, while classes having slower response times (e.g., payment transaction) are assigned numerically lower delay factors $D_i$. For example, class 1 (i.e., i=1) may require a faster response time and be assigned a normalized delay factor $D_1$=25. Alternatively, class 2 (i.e., i=2) may tolerate a slower response time and be assigned a normalized delay factor $D_2$=5.

At 304, the class allocation process 300 specifies a normalized execution time E for each class i associated with the received tasks 108 (FIG. 1). As previously indicated, each class i is assigned based on its respective execution time characteristic. Classes requiring more time to execute (e.g., payment transaction) are assigned numerically higher execution times $E_i$, while classes requiring less time to execute (e.g., streaming video) are assigned numerically lower execution times $E_i$. For example, class 1 (i.e., i=1) may require a longer execution time and be assigned a normalized execution time $E_1$=4. Alternatively, class 2 (i.e., i=2) may require a shorter execution time and be assigned a normalized delay factor $E_2$=1.

Next, at 306, the compute resource 112 (FIG. 1) available for all task classes at the current time t is specified as P(t), where P(t) is less than or equal to the maximum processing capability of the compute resource 112 (FIG. 1). The value P(t) comprises, for example, the total number of threads that can be processed by all of the active cores. For example, a server may have (15) processors, where each processor includes (20) cores each supporting (4) threads. Thus, the total number of threads for the server is P(t)=15×20×4=1200.

At 308, the class allocation process 300 calculates the amount of compute resource 112 (FIG. 1) each class will be allocated in proportion to the delay factor D and execution time E of each class i. According to one embodiment, the compute resource allocation factor A for each class i may be determined by the following formula:

$$A_i = \frac{D_i \times E_i}{(D_1 \times E_1) + (D_2 \times E_2) + \ldots + (D_N \times E_N)}$$

The value of E in the compute resource allocation factor formula is replaced with 0 for classes that have no tasks currently within the class queue 110 (FIG. 1) (i.e., the class is inactive) to ensure that no compute resources 112 (FIG. 1) are allocated to an inactive class. The resulting value of $A_i$ is less than or equal to 1 and greater than 0 when there is at least one class defined. The sum of all $A_i$ equals 1, representing 100%, thereby ensuring that all of the available compute resource will be apportioned across all of the active classes.

An illustrative example of the process at 308, for a server having three active classes, the compute resource allocation factor formula is computed three times, once for every active class. The three active classes in the example server may be: class 1 corresponding to search tasks where $D_1=5$ and $E_1=8$, class 2 corresponding to payment transaction tasks where $D_2=3$ and $E_2=4$, and class 3 corresponding to content streaming tasks where $D_3=10$ and $E_3=1$. The resource allocation factor is computed for class 1 as follows:

$$A_1 = \frac{5 \times 8}{(5 \times 8) + (3 \times 4) + (10 \times 1)} = 0.645$$

The resource allocation factor is then computed for class 2 and class 3 using the same formula. The computations in this example will result in resource allocation factors $A_1=0.645$, $A_2=0.194$ and $A_3=0.161$. Thus, the resource allocation factors indicate that class 1 receives 64.5% of the compute resource, class 2 receives 19.4% of the compute resource, and class 3 receives 16.1% of the compute resource. It may also be appreciated that these classes have an aggregate computer source of 100% (i.e., 64.5%+19.4%+16.1%=100%).

Then, at 310, the compute resource 112 (FIG. 1) is allocated to each class corresponding to the proportion determined at 308. The compute resource 112 (FIG. 1) processes all active classes simultaneously but each class may be processed at different rates. According to one implementation, tasks from each class i are allocated a portion of the compute resource R using the following formula:

$$R_i = A_i \times P(t)$$

In other words, the amount of total compute resource available P(t) (e.g., total number of available threads) when multiplied by the resource allocation factor $A_i$ results in the amount of compute resource $R_i$ (e.g., number of threads) that may be used by class i to process tasks 108 (FIG. 1). For example, a server capable of supporting 1200 threads at the current time (i.e., P(t)=1200), having a class 1 with a compute resource allocation factor $A_1=0.645$, will result in 774 threads (0.645×1200=774) allocated to class 1 to process tasks 108 (FIG. 1). Similarly, all remaining active classes will be allocated compute resource 112 (FIG. 1) using the same calculation.

At 312, according to one implementation, the class allocation process 300 checks if the energy manager process unit 106 (FIG. 1) has sent a notification to reapportion the compute resource 112 (FIG. 1). If a notification to reapportion compute resources is received, the class allocation process will go to 306. However, if no notification is received, the class allocation process 300 may recheck until a notification is received. For example, if one task (e.g., task of class 1) completes, the energy manager process within the energy manager process unit 106 (FIG. 1) initiates a reapportioning of the compute resources by sending a notification to the class allocation process 300. In addition to sending the notification, the energy manager process may also reduce the total available compute resource in accordance with the number of tasks that are actively being processed.

Figure 4:
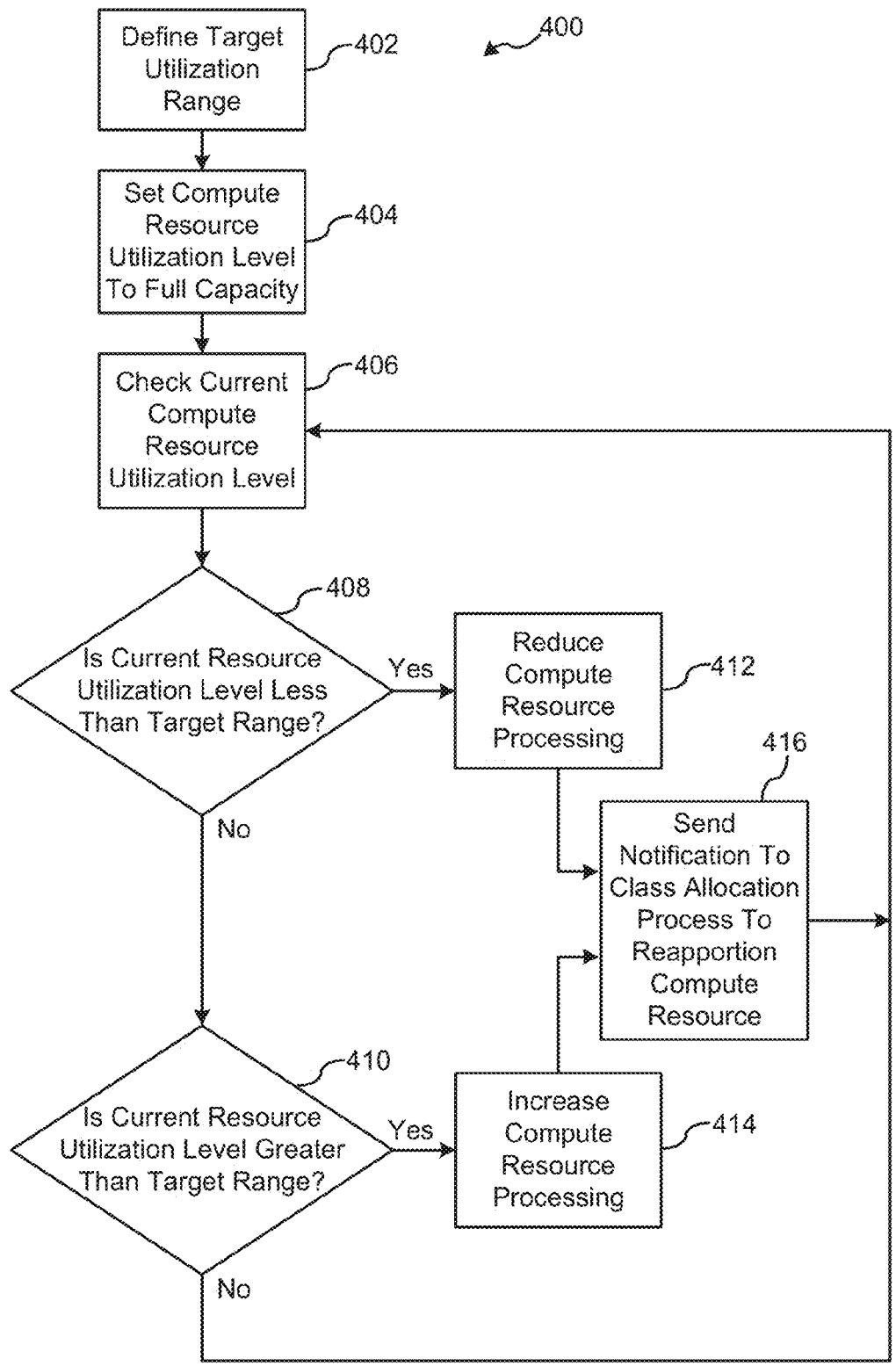
FIG. 4 is an operational flowchart illustrating a process for energy management according to at least one embodiment.

With respect to FIG. 4, an operational flowchart illustrating the exemplary energy manager process 400 performed by the energy manager process unit 106 (FIG. 1) according to at least one embodiment is depicted. Energy manager process 400 may be executed within the energy manager process unit 106 (FIG. 1). At 402, a target compute resource utilization range is defined by designating two limits. The target compute resource utilization range extends between a lower limit $U_L$ representing the minimum target resource utilization and an upper limit $U_H$ representing the maximum target resource utilization. An example target utilization range may be defined by a lower limit $U_L=90\%$ and an upper limit $U_H=95\%$.

Next, at 404, according to one embodiment, the compute resource utilization level is initially set to full utilization. This may be done, for example, by making all of the processors and processor cores active and running at full speed in the processor environment 114 (FIG. 1). Full compute resource utilization is made available to ensure that the initial set of tasks 108 (FIG. 1) are supported until compute resource utilization level can be reliably measured.

Then, at 406, the compute resource utilization level U is measured at the current time t. Next, at 408, the current utilization U(t) is compared with the lower limit $U_L$. If the current utilization U(t) is lower than the lower limit $U_L$, then there is too much active compute resource not being utilized that may in turn be consuming unnecessary energy.

If current utilization U(t) is not lower than the lower limit $U_L$, then at 410, the current utilization U(t) is compared with the upper limit $U_H$. If current utilization U(t) is higher than the upper limit $U_H$, then there is not enough active or available compute resources. However, if current utilization U(t) is not higher than the upper limit $U_H$, then current utilization U(t) is within the target compute resource utilization range and there is no need to change the available compute resource and the energy manager process 400 returns to 406.

For example, an energy manager process 400 at 408 and 410 may have a measured current utilization U(t)=93% and a target resource utilization range defined by a lower limit $U_L=90\%$ and an upper limit $U_H=95\%$. The energy manager process 400, at 408, checks if U(t) (93%) is less than $U_L$ (90%). In this example, U(t) is not lower than $U_L$ and the process 400 continues to 410 to check if U(t) (93%) is higher than $U_H$ (95%). Here, U(t) is not higher than $U_H$, thus the energy manager process 400 has determined that U(t) falls within the target resource utilization range.

At 412, the energy manager process 400 responds to the condition where current utilization U(t) is lower than the lower limit $U_L$ ("yes" at 408) by reducing available compute resources through processor power management mechanisms. For example, such mechanisms may include utilizing DVFS, processor core nap and processor folding to scale down processor core frequency or voltage, or put processor cores into low-power idle states to reduce available compute resource 112 (FIG. 1) and also reduce energy usage. One example for triggering a reduction in computer resource may occur when one or more tasks, as indicated by $T_{1A}$ and $T_{1B}$ (FIG. 1), in the class queue (e.g., FIG. 1: queue 110a) are completed.

At 414, the energy manager process 400 responds to the condition where current utilization U(t) is higher than the upper limit $U_H$ ("yes" at 410) by increasing available compute resources through processor power management mechanisms. For example, such mechanisms may include utilizing DVFS, processor core nap and processor folding to reactivate processor cores from low-power idle states or scale processor core frequency or voltage up to increase available compute resource 112 (FIG. 1) for processing tasks 108 (FIG. 1). One example for triggering an increase in computer resource may occur when one or more tasks, as indicated by $T_{1A}$ and $T_{1B}$ (FIG. 1), are added to the class queue (e.g., FIG. 1: queue 110a).

Next, at 416, according to one implementation, a notification is sent to the class allocation process 300 associated with class allocation process unit 104 (FIG. 1) to reapportion the compute resource because the amount of compute resource available has changed. The notification system may be implemented in a variety of ways, such as, for example, a function call or as a flag variable set to a predefined value. Once the notification is sent, the energy manager process 400 returns to 406.

Figure 5:
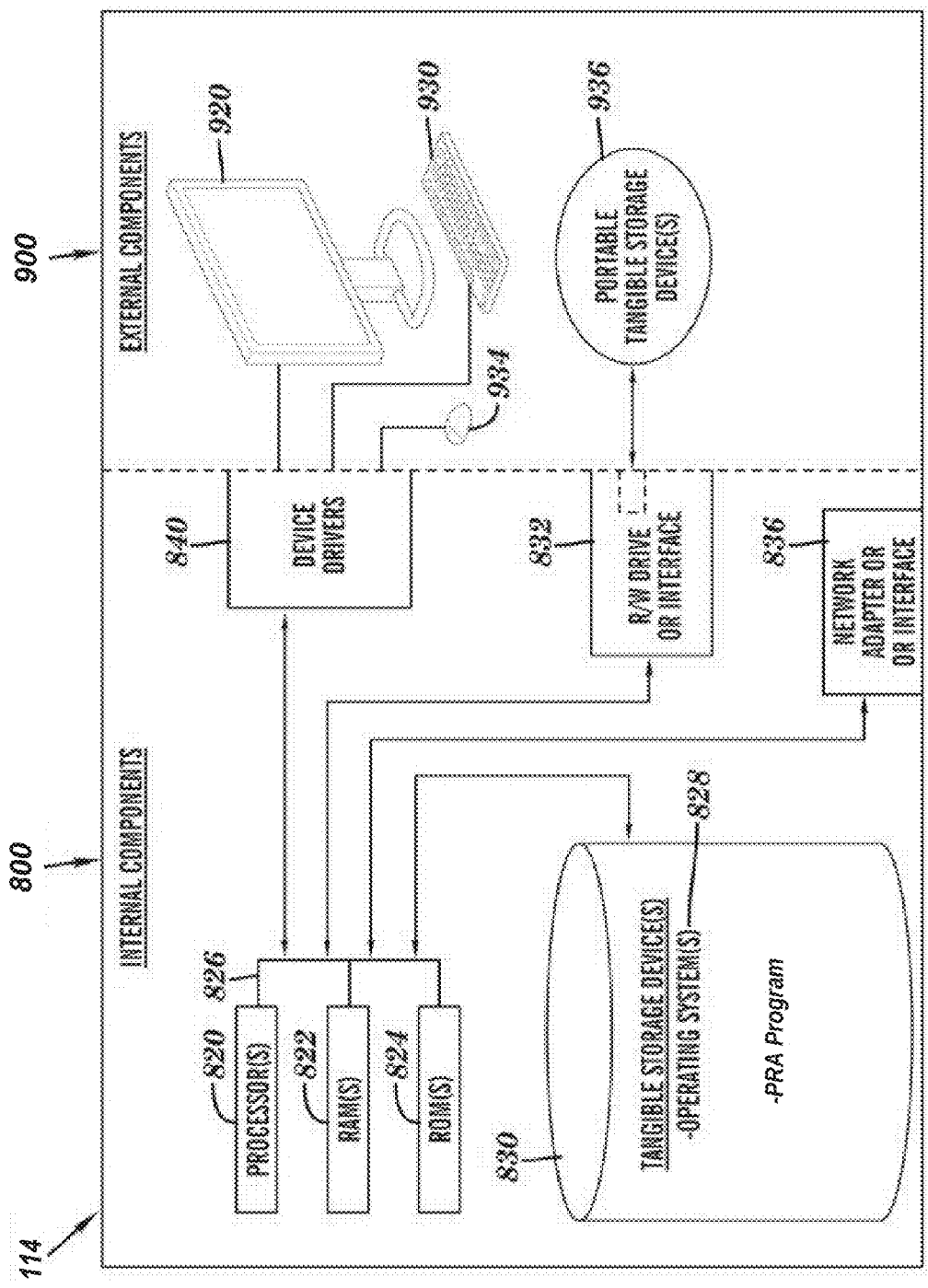
FIG. 5 is a block diagram of internal and external components of computers and servers.

FIG. 5 shows a block diagram of the exemplary components of a data processing system 800, 900, such as the processor power optimization with response time assurance system 100 (FIG. 1) in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The processor power optimization with response time assurance system 100 (FIG. 1) may include internal component 800 and external component 900 illustrated in FIG. 5. Each internal component 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a processor power optimization with response time assurance program (i.e., PRA Program) given by processes 200 (FIG. 2), 300 (FIG. 3), and 400 (FIG. 4) may be stored on one or more computer-readable tangible storage devices 830 for execution by one or more processors 820 via one or more RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each internal component 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The PRA Program associated with the processor power optimization with response time assurance system 100 (FIG. 1) can be stored on one or more of the respective portable computer-readable tangible storage devices 936, read via the respective R/W drive or interface 832 and loaded into the respective hard drive 830.

Each internal component 800 may also include network adapters (or switch port cards) or interfaces 836 such as a TCP/IP adapter cards, wireless wi-fi interface cards, or 3G or 4G wireless interface cards or other wired or wireless communication links. The PRA Program associated with the processor power optimization with response time assurance system 100 (FIG. 1), can be downloaded from an external computer (e.g., server) via a network (for example, the Internet, a local area network or other, wide area network) and respective network adapters or interfaces 836. From the network adapters (or switch port adaptors) or interfaces 836, the PRA Program of the processor power optimization with response time assurance system 100 (FIG. 1) is loaded into the respective hard drive 830. The network may comprise copper wires, optical fibers, wireless transmission, routers, firewalls, switches, gateway computers and/or edge servers.

Each external component 900 can include a computer display monitor 920, a keyboard 930, and a computer mouse 934. External component 900 can also include touch screens, virtual keyboards, touch pads, pointing devices, and other human interface devices. Each internal component 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing processor power optimization, the method comprising:
   receiving a plurality of tasks for processing by a processor environment; and
   allocating a portion of a compute resource corresponding to the processor environment to each of the received plurality of tasks,
   the allocating of the portion being based on both an execution time and a response time associated with each of the received plurality of tasks;
   receiving a utilization value for the processor environment; and
   adjusting the allocating of the portion of the computer resource to each of the received plurality of task based on the received utilization value.

2. The method of claim 1, wherein the utilization value increases based on the received plurality of tasks including an additional task for processing by the processor environment, and wherein the utilization value decreases based on the received plurality of tasks including a removed task.

3. The method of claim 2, wherein the utilization value is generated by monitoring the plurality of tasks being processed by the processor environment.

4. The method of claim 2, wherein the utilization value increases or decreases using at least one of dynamic voltage and frequency scaling, processor core nap and processor folding.

5. The method of claim 1, further comprising:
   classifying the received plurality of tasks into a plurality of classes, wherein each of the plurality of classes includes a corresponding resource allocation factor that is determined based on the execution time and the response time associated with each of the received plurality of tasks.

6. The method of claim 5, wherein the allocating of the portion of the compute resource corresponding to the processor environment comprises allocating the corresponding resource allocation factor to each of the plurality of classes.

7. The method of claim 1, wherein the processor environment comprises one of a single processor multiple core device, a single processor single core device, a multiprocessor multiple core device, and a multiprocessor single core device.

8. The method of claim 1, wherein the processor environment comprises a distributed computer environment.

9. The method of claim 1, wherein the execution time corresponds to a length of time required for completing a received task.

10. The method of claim 1, wherein the response time corresponds to a delay sensitivity of a received task.

11. The method of claim 1, wherein the received plurality of tasks comprise a search process, a payment transaction, multi-media data streaming, and a file transfer process.

12. A computer system for managing processor power optimization, comprising:
   a memory;
   a processor in communication with the memory, the processor comprising an instruction fetching unit for fetching instructions from memory and one or more execution units for executing fetched instructions;
   wherein said computer system is capable of performing a method comprising:
   receiving a plurality of tasks for processing by a processor environment; and
   allocating a portion of a compute resource corresponding to the processor environment to each of the received plurality of tasks,
   the allocating of the portion being based on both an execution time and a response time associated with each of the received plurality of tasks;
   receiving a utilization value for the processor environment; and
   adjusting the allocating of the portion of the compute resource to each of the received plurality of tasks based on the received utilization value.

13. The computer system of claim 12, wherein the utilization value increases based on the received plurality of tasks including an additional task for processing by the processor environment, and wherein the utilization value decreases based on the received plurality of tasks including a removed task.

14. The computer system of claim 13, wherein the utilization value is generated by monitoring the plurality of tasks being processed by the processor environment.

15. The computer system of claim 12, further comprising:
   classifying the received plurality of tasks into a plurality of classes, wherein each of the plurality of classes includes a corresponding resource allocation factor that is determined based on the execution time and the response time associated with each of the received plurality of tasks.

16. The computer system of claim 15, wherein the allocating of the portion of the compute resource corresponding to the processor environment comprises allocating the corresponding resource allocation factor to each of the plurality of classes.

17. A computer program product for managing processor power optimization, comprising:
   one or more computer-readable storage devices and program instructions stored on at least one of the one or more tangible storage devices, the program instructions executable by a processor, the program instructions comprising:
   receiving a plurality of tasks for processing by a processor environment; and
   allocating a portion of a compute resource corresponding to the processor environment to each of the received plurality of tasks,
   the allocating of the portion being based on both an execution time and a response time associated with each of the received plurality of tasks;
   receiving a utilization value for the processor environment; and
   adjusting the allocating of the portion of the compute resource to each of the received plurality of tasks based on the received utilization value.

* * * * *